(12) United States Patent
Moussaoui et al.

(10) Patent No.: US 8,552,699 B2
(45) Date of Patent: Oct. 8, 2013

(54) SYSTEM AND METHOD FOR ACTIVE ELECTROMAGNETIC INTERFERENCE REDUCTION FOR A SWITCHING CONVERTER

(75) Inventors: Zaki Moussaoui, San Carlos, CA (US); Jifeng Qin, San Jose, CA (US); Colm Brazil, Mountain View, CA (US)

(73) Assignee: Intersil Americas Inc., Milpitas, CA (US)

( * ) Notice: Subject to any disclaimer, the term of this patent is extended or adjusted under 35 U.S.C. 154(b) by 213 days.

(21) Appl. No.: 13/286,346

(22) Filed: Nov. 1, 2011

(65) Prior Publication Data

US 2012/0262139 A1 Oct. 18, 2012

Related U.S. Application Data

(60) Provisional application No. 61/475,898, filed on Apr. 15, 2011.

(51) Int. Cl.
*G05F 1/613* (2006.01)
*G05F 1/00* (2006.01)

(52) U.S. Cl.
USPC .......................... 323/224; 323/266; 323/222

(58) Field of Classification Search
USPC ........................................ 323/222, 224, 266
See application file for complete search history.

(56) References Cited

U.S. PATENT DOCUMENTS

| | | | | |
|---|---|---|---|---|
| 6,198,260 B1 * | 3/2001 | Wittenbreder | ................ | 323/271 |
| 6,522,109 B2 * | 2/2003 | Tanaka | ........................... | 323/222 |
| 7,548,435 B2 * | 6/2009 | Mao | ................................ | 363/16 |
| 7,893,677 B2 * | 2/2011 | Nguyen | ........................ | 323/284 |
| 8,278,896 B2 * | 10/2012 | Horii | ............................... | 323/282 |

FOREIGN PATENT DOCUMENTS

JP 2010093893 4/2010

* cited by examiner

*Primary Examiner* — Bao Q Vu
*Assistant Examiner* — Zekre Tsehaye
(74) *Attorney, Agent, or Firm* — Gary Stanford

(57) ABSTRACT

An EMI reduction network for a converter, the converter including upper and lower power switches provided between an input voltage node and a reference node. An inductance is coupled between the input voltage node and the upper switch at a first node, a capacitance and an auxiliary power switch are coupled in series between the first and reference nodes, and a controller is provided to control switching. The controller switches the upper switch based on a PWM signal. The controller keeps the lower switch turned on until the phase node goes positive while the upper switch is on. The controller turns the auxiliary switch on after the lower power switch is turned off and turns the auxiliary switch off after the upper power switch is turned off. The lower and auxiliary switches may be zero voltage switched, and the upper switch may be zero current switched.

20 Claims, 7 Drawing Sheets

SWITCHING OF CONVERTER 200 WITH EMI FILTERING

SWITCHING OF CONVENTIONAL CONVERTER 100

US 8,552,699 B2

SYSTEM AND METHOD FOR ACTIVE ELECTROMAGNETIC INTERFERENCE REDUCTION FOR A SWITCHING CONVERTER

CROSS-REFERENCE TO RELATED APPLICATIONS

This application claims the benefit of U.S. Provisional Application Ser. No. 61/475,898, filed on Apr. 15, 2011, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Switching converters, including those implemented according to a buck-type configuration including a buck-type converter in which a larger input voltage VIN is converted to a smaller output voltage VOUT, inherently include a parasitic loop which may cause significant ringing at the switch node. The ringing may further generate undesired electromagnetic interference (EMI). The EMI may be radiated to internal or external circuitry or even nearby electronic equipment, which may cause faulty operation or even failure of the electronic device or other electronic devices or equipment. A converter as described herein may be used within sensitive electronic devices, such as instrumental electronics or medical devices or the like. It is desired to minimize or even eliminate EMI to the extent possible.

Figure 1:
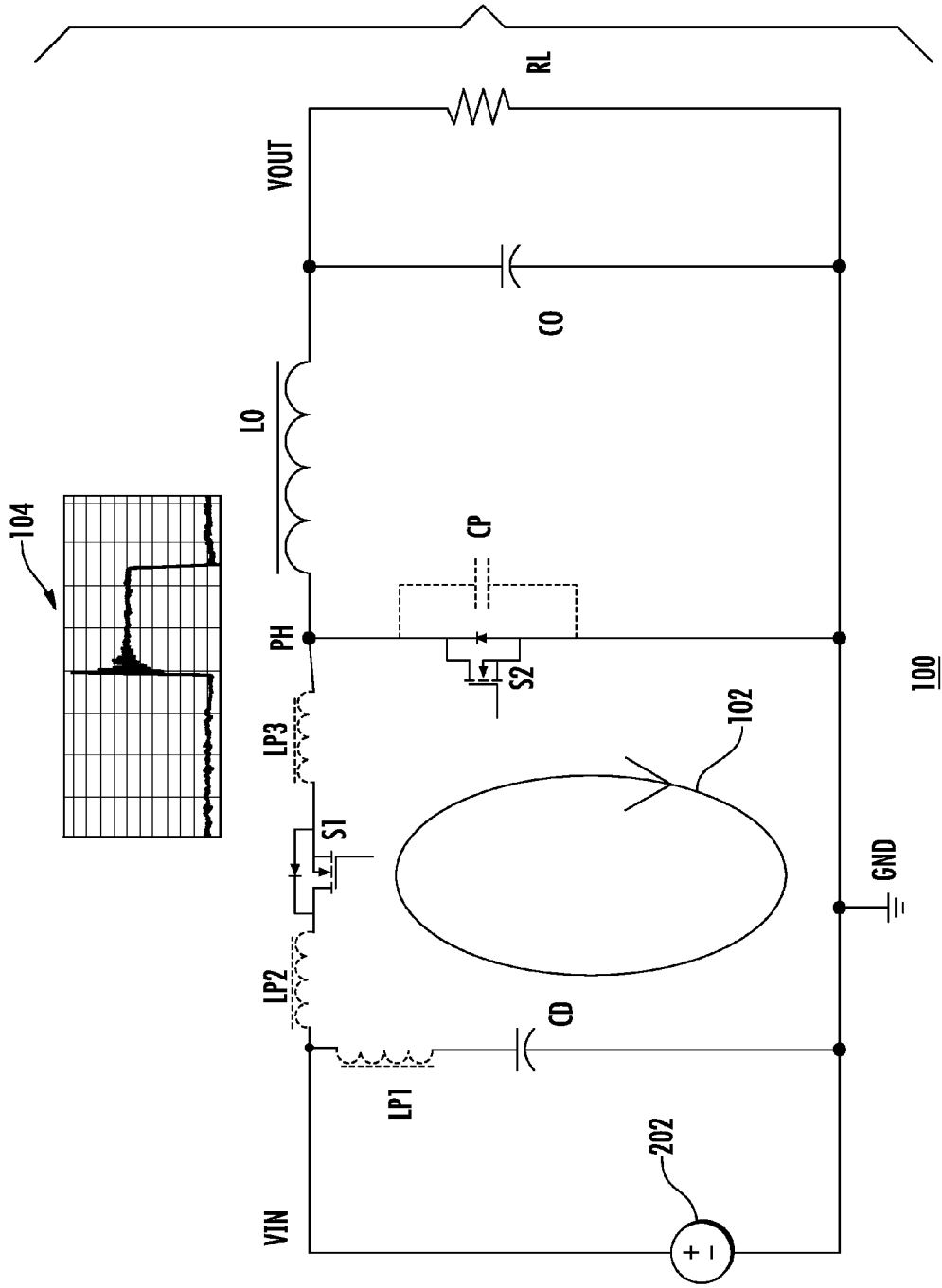
FIG. 1 is a simplified schematic diagram of a conventional buck-type converter which incorporates a parasitic loop.

FIG. 1 is a simplified schematic diagram of a conventional buck-type converter 100 which incorporates a parasitic loop 102 illustrated by a loop arrow. The converter includes an input voltage source 202 providing an input voltage VIN, electronic power switches S1 and S2, an output inductor LO, an output capacitor CO and an output load represented by load resistor RL. The switches S1 and S2 are coupled together and to the output inductor L1 as a phase node PH. The elements LP1, LP2 and LP3 are parasitic inductances rather than physical inductors and thus are illustrated with dashed lines. The element CP depicts parasitic capacitance of switch S2 rather than a physical capacitor and is also shown with dashed lines. CP represents the effects of the drain-source, drain-gate and gate-source capacitances of the electronic power switch S2. A decoupling capacitor CD for the input voltage is also shown. The parasitic elements along with the capacitor CD form the parasitic loop 102.

In the conventional converter 100, S1 is an "upper" electronic switch which is activated or turned on to couple the phase node PH to VIN, and then the upper switch S1 is turned off and the "lower" switch S2 is turned on to couple the phase node PH to GND. When a new cycle is initiated according to PWM control, the lower switch S2 is turned off and then the upper switch S1 is turned back on, and operation toggles in this manner to perform voltage conversion as understood by those of ordinary skill in the art. Deadtime control ensures that both switches S1 and S2 are not turned on at the same time, so that one switch is turned off before the other is turned on and vice-versa.

During switching, the parasitic devices cause ringing shown at 104 in a timing diagram inset. Such significant ringing during switching generates undesired EMI. The switching frequency of the converter 100 may be in the tens or hundreds of kilohertz (kHz) or the like, whereas the ringing may be in the tens or hundreds of megahertz (MHz) or the like. Such ringing may be radiated to internal or external circuits or nearby electronic devices and equipment causing undesired EMI.

Figure 2:
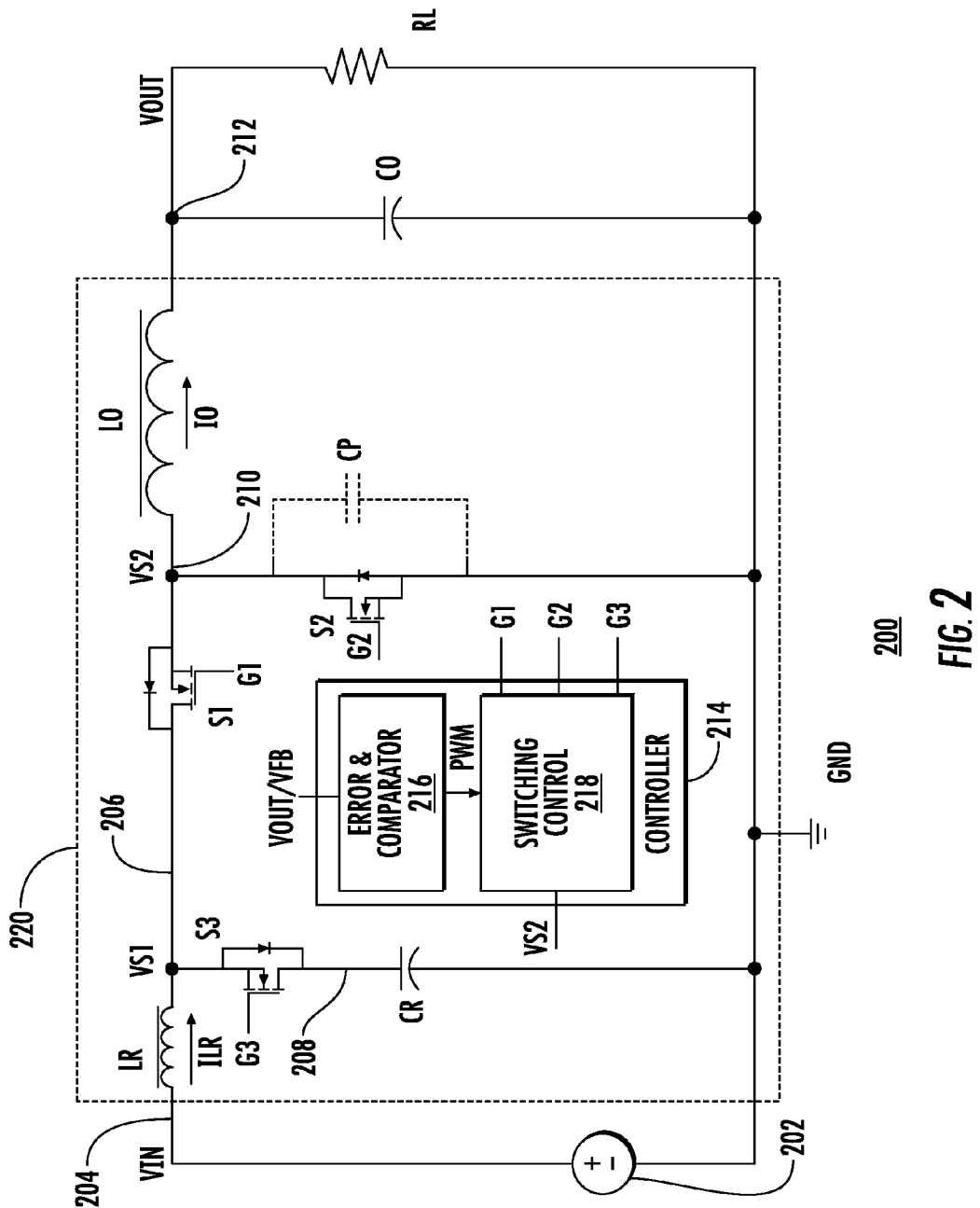
FIG. 2 is a schematic diagram of a converter implemented according to one embodiment of the present invention including additional components for reducing switching ringing and EMI.

FIG. 2 is a schematic diagram of a converter 200 implemented according to one embodiment of the present invention including additional components for reducing switching ringing and EMI. The input voltage source 202 develops an input voltage VIN on an input node 204. An inductor LR is coupled between node 204 and a node 206 developing a voltage VS1, which is further coupled to the source of an electronic power switch S3 and to the drain the electronic power switch S1. The drain of S3 is coupled to one end of a capacitor CR, having its other end coupled to a reference node, such as ground (GND). The source of S1 is coupled to a phase node 210 developing a voltage VS2, which is further coupled to one end of the output inductor LO and to the drain of the other electronic power switch S2. The source of S2 is coupled to GND. The parasitic capacitor CP is shown coupled between node 210 and GND, which represents parasitic capacitance of switch S2 and is shown with dashed lines. The other end of LO is coupled to an output node 212 developing an output voltage VOUT, which is further coupled to one end of the output capacitor CO and to one end of the load resistor RL. The load resistor RL represents any type of load receiving output voltage VOUT as source voltage provided by the converter 200. The other ends of CO and RL are coupled to GND.

The devices LR, S3 and CR are added as compared to a conventional configuration. The switches S1 and S2 are the main power switches and S3 is an auxiliary third switch. A controller 214 provides gate control signals G1, G2 and G3 to the gates of the electronic switches S1, S2 and S3, respectively. The electronic switches S1, S2 and S3 (S1-S3) are each shown as an N-type, metal-oxide semiconductor, field effect transistor (MOSFET), although alternative types of switches or transistors are contemplated, such as P-type MOSFETs, other types of FETs and the like, and other types of transistors, such as bipolar junction transistors (BJTs) or insulated-gate bipolar transistors (IGBTs) and the like, etc.

The controller 214 is provided or otherwise modified to control the switches S1-S3 to reduce or otherwise minimize switch ringing and EMI emissions. The switching operation of S1 and S2 is modified and the switch S3, inductor LR and capacitor CR are included to reduce ringing and EMI as further described herein.

In one embodiment, the controller 214 operates according to pulse width modulation (PWM) control. In a more specific configuration, the controller 214 includes an error and comparator network 216 and a switching controller 218. VOUT is sensed by the error and comparator network 216, in which VOUT is either provided directly or via a feedback circuit (not shown) providing a corresponding feedback voltage VFB. For example, the feedback circuit may be implemented as a resistive divider or the like for dividing VOUT down to a lower voltage level. The error and comparator network 216 includes an error amplifier or the like (not shown) which compares VOUT or sensed version thereof with a reference level or the like for developing an error or compensation signal or the like. A compensation network (not shown) may be included for purposes of loop control and the like. The error/compensation signal may be provided to a comparator network, which is used to develop a pulse control signal such as a pulse width modulation (PWM) signal. As understood by those of ordinary skill in the art, the duty cycle of PWM is controlled to regulate the voltage level of VOUT. PWM and VS2 are provided to the switching controller 218 which develops the gate control signals G1, G2 and G3 based on the PWM signal and VS2.

In one embodiment, the converter 200 is implemented on a power module 220, in which substantially all of the components, devices or elements other than the input voltage source 202 and the load RL are provided on the power module 220. The output capacitor CO, or a portion thereof, may be provided on the power module 220 in some embodiments, or may be externally provided.

The controller 214 may be implemented on an integrated circuit (IC) or the like, which may be incorporated on the power module 220 in one embodiment. The switching controller 218 may include a gate driver (not shown) for driving the G1, G2 and G3 signals.

For an IC configuration, the gate driver may be implemented within the switching controller 218 on the IC for lower current configurations. Alternatively, the gate driver is separately implemented off-chip for higher current applications. The switches S1-S3 may be incorporated on an IC controller for lower current applications, or may be externally coupled for higher current applications.

Figure 3:
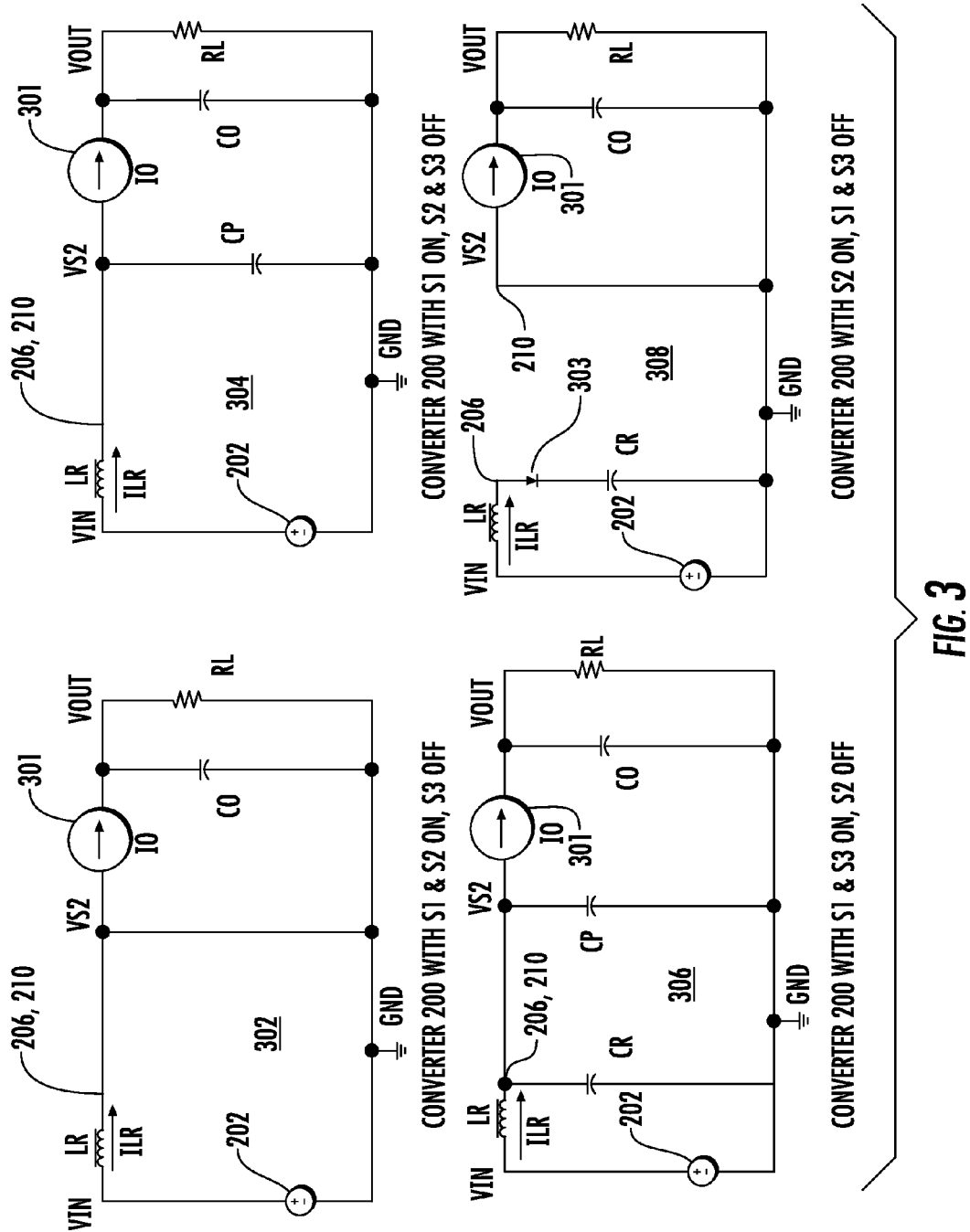
FIG. 3 is a set of schematic diagram circuit depictions depicting the converter of FIG. 2 in corresponding modes of operation based on the states of the switches S1-S3.

FIG. 3 is a set of schematic diagram circuit depictions 302, 304, 306 and 308 depicting the converter 200 in corresponding modes of operation based on the states of the switches S1-S3 as controller by the G1-G3 signals, respectively. The capacitance CP is shown with solid lines although it is understood that it is a parasitic element. Circuit depiction 302 illustrates the converter 200 with S1 and S2 turned on and with S3 turned off during a power portion of the PWM cycle. Circuit depiction 304 illustrates the converter 200 with S1 turned on and with S2 and S3 turned off. Circuit depiction 306 illustrates the converter 200 with S1 and S3 turned on and with S2 turned off. Circuit depiction 308 illustrates the converter 200 with S2 turned on and with S1 and S3 turned off.

In each case, each of the switches S1-S3 is replaced by a short-circuit when "closed" or turned on, and is replaced by an open-circuit when "opened" or turned off. S1, when turned on, effectively couples nodes 206 and 210 together, and when turned off, isolates nodes 206 and 210 from each other. S2, when turned on, short-circuits capacitor CP to effectively remove it from the circuit, and when turned off, places CP back into the circuit. S3, when turned on, places capacitor CR into the circuit as shown in circuit depiction 306. S3, when turned off as shown in circuit depictions 302 and 304, effectively removes the capacitor CR from the circuit. As shown by circuit depiction 308, however, the internal body diode 303 of switch S3 enables current flowing through LR to discharge through CR while switch S3 is turned off. The output inductor LO is depicted as a current source 301 providing inductor current IO.

Figure 4:
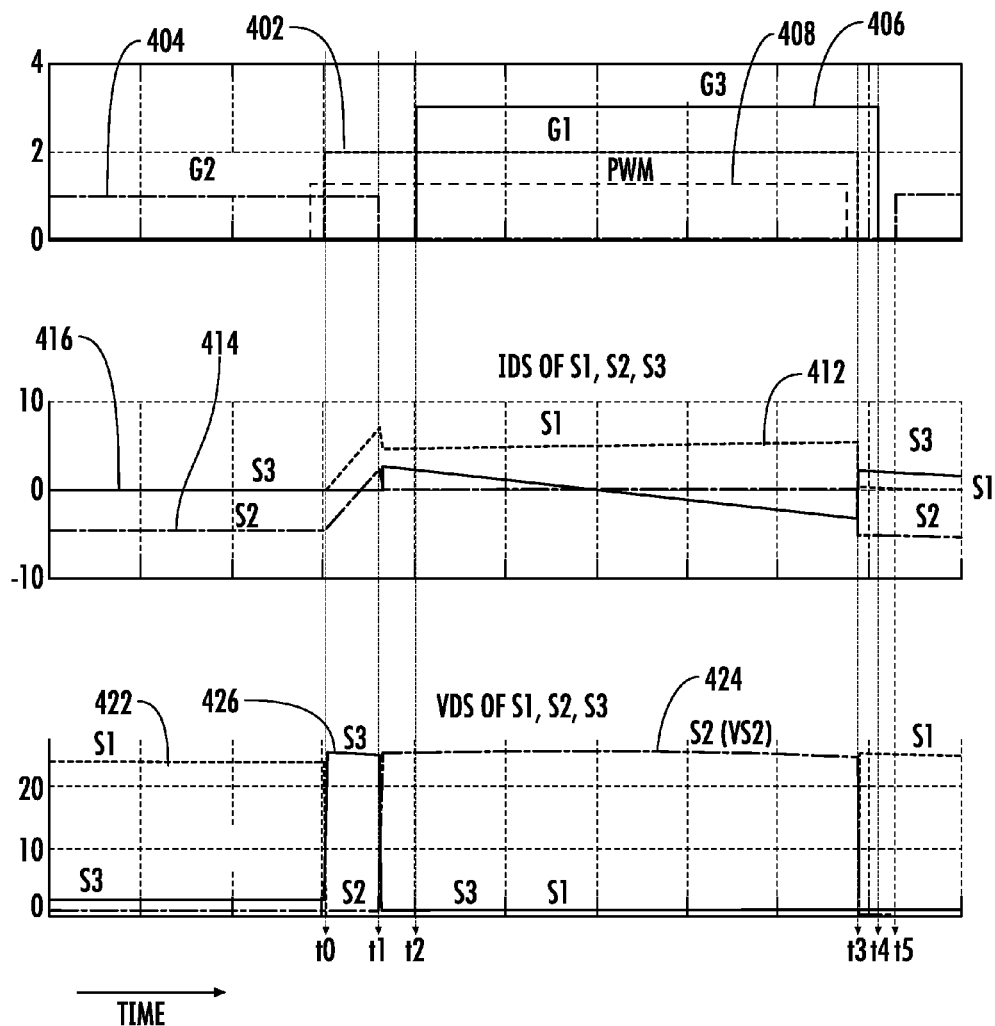
FIG. 4 is a set of three timing diagrams illustrating operation of the switches S1-S3 of the converter of FIG. 2.

FIG. 4 is a set of three timing diagrams illustrating operation of the switches S1-S3 of the converter 200. The first timing diagram of FIG. 4 plots the gate drive signals G1, G2 and G3 at 402, 404 and 406, respectively, versus time, and further shows the PWM signal at 408 with a dashed line. The second timing diagram of FIG. 4 plots the corresponding drain-source current (IDS) of the switches S1, S2 and S3 at 412, 414 and 416, respectively. The third timing diagram of FIG. 4 plots the corresponding drain to source voltages (VDS) of the switches S1, S2 and S3 at 422, 424 and 426, respectively.

Figure 5:
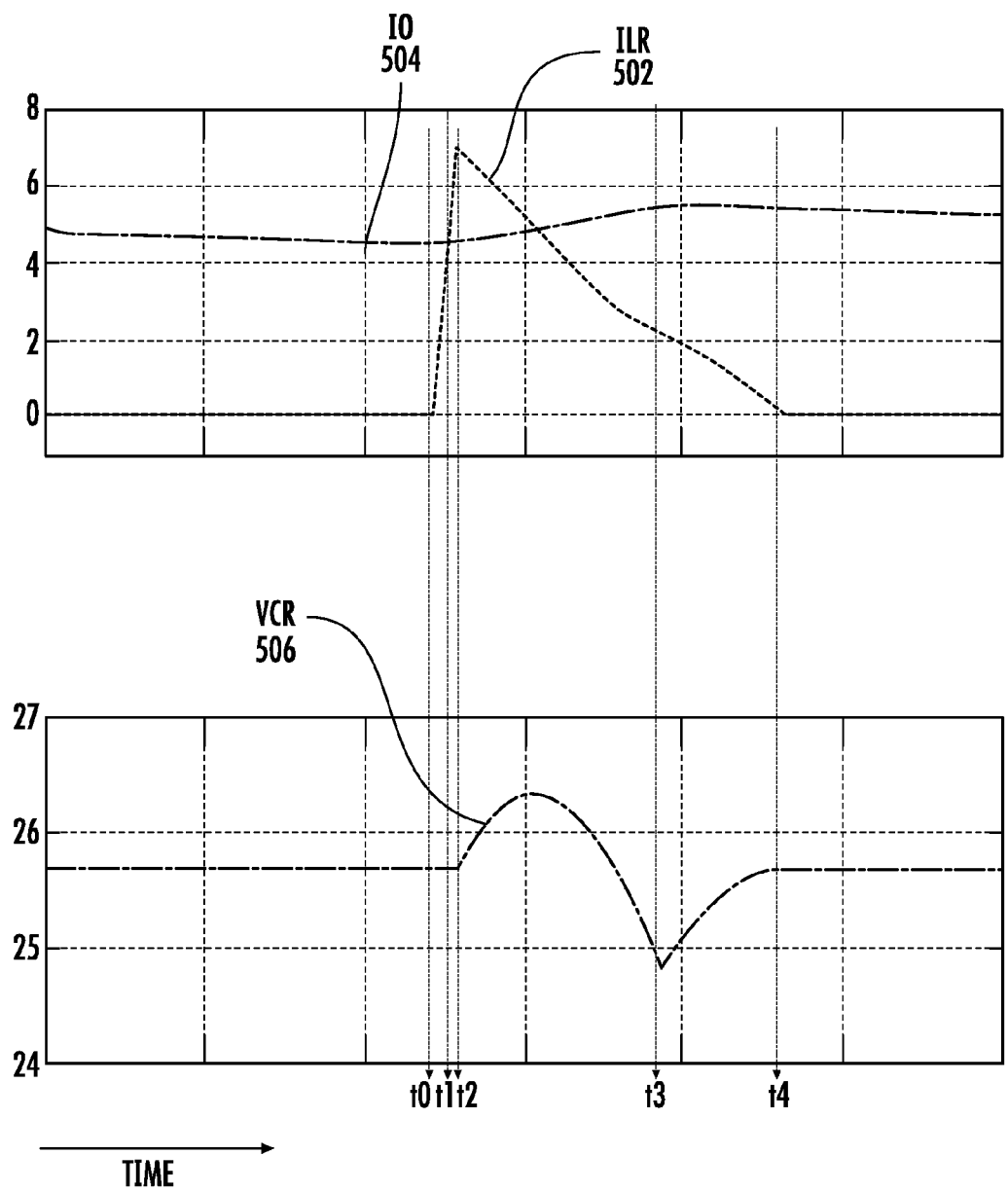
FIG. 5 is a pair of timing diagrams showing currents and voltages illustrating operation of the converter of FIG. 2 during the same time period of FIG. 4.

FIG. 5 is a pair of timing diagrams showing currents and voltages illustrating operation of the converter of FIG. 2 during the same time period of FIG. 4, in which FIGS. 4 and 5 are collectively considered. The first timing diagram of FIG. 5 plots the current ILR through the inductor LR versus time shown at 502, and plots the current IO through the inductor LO versus time shown at 504. The second timing diagram of FIG. 5 plots the voltage VCR across the capacitor CR versus time shown at 506.

The PWM signal is developed by or otherwise within the controller 214 to control switching operation of the switches S1-S3 of the converter 200. The PWM toggles between first and second states as understood by those of ordinary skill in the art. When the PWM signal goes from a first state (e.g., low) to a second state (e.g., high), a new power cycle is initiated, and then the PWM signal goes back to the first state for the remainder of the cycle. The switching of S1, S2 and S3 are primarily determined based on the PWM signal.

As shown in FIGS. 3-5, prior to a first time t0, switch S2 is on from a prior PWM cycle while S1 and S3 are off according to the circuit depiction 308 (S2 on, S1 and S3 off). At time t0, switch S1 is turned on in response to PWM going high to initiate a new cycle, where S1 turns on while S2 is still on and S3 is off according to circuit depiction 302 (S1 and S2 on, S3 off). In a conventional configuration, S1 and S2 would normally not be turned on at the same time according to deadtime control operation. For the converter 200, however, deadtime control is used between S2 and S3 by inserting a deadtime period from when S2 is turned off and S3 is turned on, and between S1 and S2 by inserting another deadtime period from when S1 is turned off and S2 is turned back on.

When S1 is turned on while S2 is on, nodes 206 and 210 are effectively coupled together and momentarily coupled to GND. As shown in FIG. 5, ILR rises relatively quickly to source current from the input node 204 during the power portion of the cycle. At subsequent time t1, the current ILR crosses IO so that they are both equal momentarily, and the switch S2 is turned off at about time t1 so that the converter 200 is according to circuit depiction 304 (S1 on, S2 and S3 off). Ideally, S2 may be turned off just when ILR becomes equal to IO. From a practical standpoint, however, it is difficult (or otherwise more costly) to measure these currents and make this determination with sufficient accuracy. Instead, when ILR rises above IO, VS2 on node 210 goes positive. Note that in circuit depiction 304, while IO is greater than ILR, current is sourced from ground to node 210 through capacitance CP. This is the drain-source current IDS of S2 shown at 414 by the middle timing diagram of FIG. 4, where the IDS of S2 is initially less than zero before and just after time t0. Since the IDS current of S2 is source from ground through CP, VS2 is initially less than zero. As the IDS of S2 rises and becomes 0V just before time t1, VS2 also rises and becomes 0V at approximately the same time and is detected going positive. Thus, the voltage VS2 on phase node 210 is monitored and when it goes positive during this portion of the cycle, the switch S2 is turned off.

After a relatively short deadtime period from t1 when S2 is turned off, S3 is turned on at time t2 so that the converter 200 is according to circuit depiction 306 (S1 and S3 on, S2 off). S3 is turned on at ZVS (zero voltage switching).

At subsequent time t3, the controller 214 turns S1 off just after the PWM signal goes low indicating that the power portion of the cycle is completed. A short time after t3, S3 is turned off at time t4. Ideally, S3 is turned off when the current ILR goes back to zero, which is about time t4. In one embodiment a current sensor or the like is used to detect the level of current ILR at about zero for determining when to turn S3 off. ILR is about zero when VS1 is about equal to VIN. In another embodiment, a voltage comparator or the like is used to detect the voltage difference between VIN and VS1 for turning S3 off when the voltage difference is about zero. Either method is employs an additional device or circuitry (e.g., current sensor or voltage comparator) to make this determination. In another embodiment, S3 is turned off after a short delay after S1 is turned off.

After another relatively short deadtime delay from time t3 when S1 is turned off, S2 is turned back on at time t5 (according to circuit description 308), and remains on until after the next PWM cycle begins when S1 is turned back on as previously described.

From time t5, the current ILR flowing through LR is discharged by capacitor CR according to circuit depiction 308. In this manner, for the next PWM cycle the switch S1 achieves zero current switching with minimized ringing.

In review of FIGS. 2-5, the switches S2 and S3 are turned on and off according to zero voltage switching, and S1 is turned on according to zero current switching.

Figure 6:
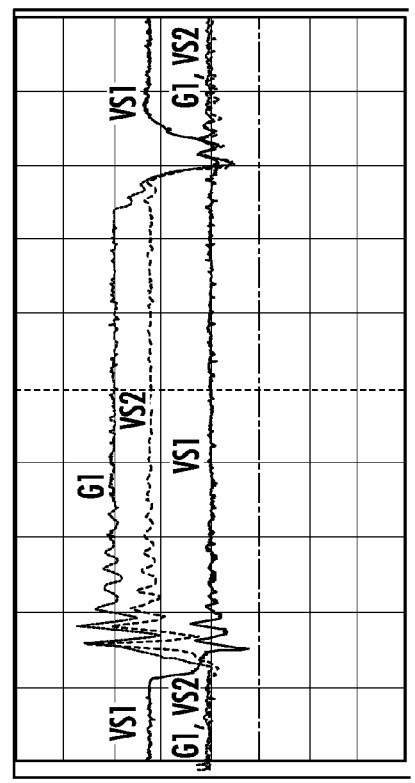
FIG. 6 is a timing diagram illustrating the switching voltages of S1 and S2 and VS2 for the conventional buck-type converter of FIG. 1.

FIG. 6 is a timing diagram illustrating the switching voltages of the gate to source voltage of S1 (or G1), VS1 and VS2 for the conventional buck-type converter 100. Significant ringing is observed on the voltage signals, which results in significant radiated EMI.

Figure 7:
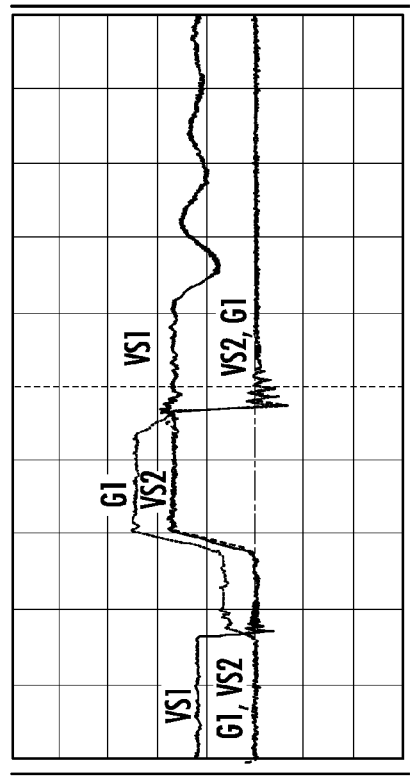
FIG. 7 is a timing diagram illustrating the gate to source voltage of S1 (G1) and the voltages VS1 and VS2 for the converter of FIG. 2 during switching operation.

FIG. 7 is a timing diagram illustrating the switching voltages of G1, VS1 and VS2 for the converter 200 during switching operation. The level of ringing or oscillations is substantially reduced as compared to the conventional configuration shown in FIG. 6.

Figure 8:
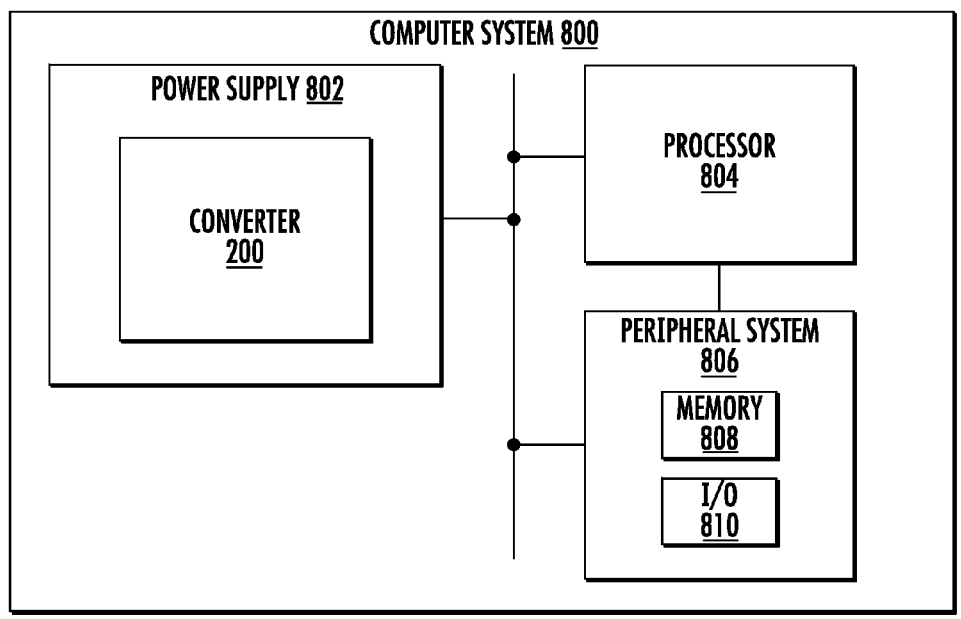
FIG. 8 is a simplified block diagram of a computer system configured with a power supply including a converter implemented according to an embodiment of the present invention, such as according to the converter of FIG. 2.

FIG. 8 is a simplified block diagram of an electronic device, such as a computer system 800, configured with a power supply 802 including the converter 200. The power supply 802 develops the supply voltages including VOUT developed by converter 200 to provide power to other system devices of the computer system 800. In the illustrated embodiment, the computer system 800 includes a processor 804 and a peripheral system 806, both coupled to receive supply voltages from the power supply 802. In the illustrated embodiment, the peripheral system 806 may include any combination of a system memory 808 (e.g., including any combination of RAM and ROM type devices and memory controllers and the like), and an input/output (I/O) system 810, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the following claim(s).

The invention claimed is:

1. An electromagnetic interference reduction network for a converter, wherein the converter includes upper and lower power switches having current terminals coupled together at a phase node and provided in series between an input voltage node and a reference node, said electromagnetic interference network comprising:
   an inductance for coupling between the input voltage node and the upper power switch at a first node;
   an auxiliary power switch having current terminals coupled between said first node and a second node;
   a capacitance for coupling between said second node and the reference node; and
   a controller for controlling switching of the upper and lower power switches and said auxiliary power switch based on a pulse control signal which toggles between first and second states, wherein said controller operates to:
      provide a first control signal to turn the upper power switch on in response to the pulse control signal switching to the second state and to turn the upper power switch off in response to the pulse control signal switching to the first state;
      provide a second control signal to turn the lower power switch on after the upper power switch is turned off and to turn the lower power switch off approximately when the voltage on the phase node goes positive while the upper switch is on; and
      provide a third control signal to turn said auxiliary power switch on after the lower power switch is turned off and to turn said auxiliary power switch off after the upper power switch is turned off.

2. The electromagnetic interference reduction network of claim 1, wherein said auxiliary power switch comprises a field-effect transistor including an internal body diode which enables current to flow through said inductance while said auxiliary power switch and the upper power switch are both turned off.

3. The electromagnetic interference reduction network of claim 1, wherein said controller provides said third control signal to turn on said auxiliary power switch after a deadtime period from when the lower power switch is turned off.

4. The electromagnetic interference reduction network of claim 1, wherein said controller provides said second control signal to turn on the lower power switch after a deadtime period from when the upper power switch is turned off.

5. The electromagnetic interference reduction network of claim 1, wherein said controller provides said third control signal to turn off said auxiliary power switch when a current through said inductance is about zero.

6. The electromagnetic interference reduction network of claim 1, wherein said controller provides said third control signal to turn off said auxiliary power switch when a voltage across said inductance is about zero.

7. The electromagnetic interference reduction network of claim 1, wherein said controller turns on and off the lower power switch and said auxiliary power switch according to zero voltage switching, and turns the upper power switch on according to zero current switching.

8. An electronic device, comprising:
   first and second power switches having current terminals coupled in series between a first node and a reference node and coupled together at a phase node;
   an input inductance coupled between an input node for providing an input voltage and said first node;
   a third power switch having current terminals coupled between said first node and a second node;
   a capacitance coupled between said second node and said reference node; and
   a controller which provides control signals to switch on and off said first, second and third power switches based on a pulse control signal toggling between first and second states based on pulse-width control, wherein said controller operates to:
      turn on said first power switch after said pulse control signal switches to said second state, and to turn off said first power switch after said pulse control signal switches to said first state;
      turn on said second power switch after said first power switch is turned off and to turn off said second power switch approximately when the voltage on said phase node goes positive while said first power switch is on; and
      turn on said third power switch after said second power switch is turned off and to turn off said third power switch after said first power switch is turned off.

9. The electronic device of claim 8, wherein said first, second and third power switches, said input inductance, said capacitance, and said controller are implemented on a power control module.

10. The electronic device of claim 8, wherein said first, second and third power switches, said input inductance, said capacitance, and said controller are collectively implemented on a power supply providing an output voltage, further comprising a processor coupled to a memory, wherein at least one of said processor and memory receive the output voltage.

11. The electronic device of claim 10, wherein said controller comprises an error and comparator circuit which receives a signal indicative of said output voltage and which provides said pulse control signal.

12. The electronic device of claim 8, wherein said third power switch comprises a field-effect transistor including an internal body diode which enables current to flow through said input inductance while said first and third power switches are both turned off.

13. The electronic device of claim 8, wherein said controller turns said third power switch on after a deadtime period from when said second power switch is turned off.

14. The electronic device of claim 8, wherein said controller turns said second power switch on after a deadtime period from when said first power switch is turned off.

15. The electronic device of claim 8, wherein said controller turns said third power switch off when current through said input inductance is about zero.

16. The electronic device of claim 8, wherein said controller turns said third power switch off when voltage across said input inductance is about zero.

17. The electronic device of claim 8, wherein said controller turns on and off the second and third power switches according to zero voltage switching, and turns said first power switch on according to zero current switching.

18. A method of operating a controller of a converter, wherein the converter comprises a first inductance coupled between an input voltage node and a first node, a first power switch having current terminals coupled between the first node and a second node, a second inductance coupled between the second node and an output node providing an output voltage, a second power switch having current terminals coupled between the second node and a reference node, a third power switch having current terminals coupled between the first node and a third node, a capacitance coupled between the third node and the reference node, and an error amplifier and comparator network which senses the output voltage and develops a pulse control signal which switches between first and second states during successive power cycles of the converter, said method comprising:
   controlling the first power switch by turning on the first power switch after the pulse control signal switches to the second state, and by turning off the first switch after the pulse control signal switches to the first state;
   controlling the second power switch by turning on the second power switch after the first power switch is turned off, and by turning off the second power switch after the first power switch is turned on approximately when the voltage of the second node goes positive; and
   controlling the third power switch by turning on the third power switch after the second power switch is turned off, and by turning off the third power switch after the first power switch is turned off.

19. The method of claim 18, wherein said controlling the third power switch comprises turning on the third power switch after a deadtime period from when the second power switch is turned off.

20. The method of claim 18, wherein said controlling the third power switch comprises turning off the third power switch when current through the first inductor is about zero.

* * * * *